United States Patent

[11] 3,613,092

[72] Inventors Paul A. Schumann;
Lindell P. Cruise; Alan F. McCrea, all of Richmond, Va.
[21] Appl. No. 818,571
[22] Filed Apr. 23, 1969
[45] Patented Oct. 12, 1971
[73] Assignee Robertshaw Controls Company
Richmond, Va.

[54] SEQUENCE COUNTING ENCODER MONITOR
23 Claims, 8 Drawing Figs.
[52] U.S. Cl. ..................................................... 340/413,
340/213, 340/150, 340/223
[51] Int. Cl. ...................................................... H04q 9/00
[50] Field of Search............................................ 340/413,
213.1, 408, 412, 204, 150, 151, 163, 147, 223

[56] References Cited
UNITED STATES PATENTS
3,278,920 10/1966 Sargent et al. ................ 340/413
3,384,874 5/1968 Morley ........................... 340/163
3,392,378 7/1968 Perry ............................. 340/150

3,518,628 6/1970 Giel et al. ...................... 340/163

Primary Examiner—John W. Caldwell
Assistant Examiner—Robert J. Mooney
Attorneys—Auzville Jackson, Jr., Robert L. Marben and Anthony A. O'Brien ABSTRACT: A sequence counting encoder monitoring system including a control center having a timing and control circuit for generating scanning pulses, a priority and interrupt circuit for providing scan initiation pulses and synthetic end-of-scan pulses to the timing and control circuit, and a preselect and counting circuit for indicating the encoder being monitored, for stopping a scan at a preselected encoder and for indicating the end of a scan; and a plurality of field encoders interconnected in series with the control center by a cable having a plurality of wires the number of which is determined by the number of pulses generated at the control center and the number of conditions to be sensed at the field encoders and not by the number of field encoders, each of the field encoders including a stage of a shift register to provide selective monitoring of the field encoders and pulse generators for providing acknowledge and alarm pulses.

FIG. 1

INVENTORS
PAUL A. SCHUMANN
ALAN F. McCREA
LINDELL P. CRUISE

BY Anthony A. O'Brien
ATTORNEY

FIG. 2

INVENTORS
PAUL A. SCHUMANN
ALAN F. McCREA
LINDELL P. CRUISE
BY Anthony A. O'Brien
ATTORNEY

INVENTORS
PAUL A. SCHUMANN
ALAN F. McCREA
LINDELL P. CRUISE

BY Anthony A. O'Brien
ATTORNEY

FIG. 7

SEQUENCE COUNTING ENCODER MONITOR

BACKGROUND OF THE INVENTION

The present invention pertains to monitoring systems and more particularly to sequential monitoring systems utilizing stages of a shift register to identify and scan a plurality of remote field encoders.

With the advent of complex systems of environmental control, pipelines, and industrial plant processes a great need has evolved for monitoring systems capable of monitoring a myriad of points with respect to conditions which must be continuously observed in order to assure proper and safe operation. Similarly, alarm conditions at the points must be immediately discovered and corrected, thus requiring systems that are capable of indicating alarm conditions as well as scanning the points.

Monitoring systems capable of providing the above functions have been proposed in the past; however, all of the proposed systems have the disadvantages of high cost and great complexity. Due to the great number of remote field points that must be monitored, conventional monitoring systems utilize a control center as a receiving and sending station for monitoring the remote points which generally are scattered over great distances. Some conventional systems utilize pulse width modulation or frequency modulation to address and monitor the field points; however, these systems are extremely complex and expensive and are desirable only where extremely great distances are involved or in underdeveloped or inaccessible locations where the use of cable wires is impractical.

For inplant processes and environmental control in a building or complex of buildings pulse width modulation and frequency modulation systems are impractical, and systems for such application are generally based on the matrix concept as can be seen from U.S. Pat. No. 3,300,759. While the use of matrices and binary coded addresses for field points does reduce the number of wires required below the number of wires required for each point to be individually connnected to the control center, the reduction in the number of wires is not as great as is desirable, and the number of wires required is dependent upon the number of points monitored thereby decreasing system flexibility. These conventional systems suffer from the disadvantages of difficult installation due to the different addresses associated with each field location and difficult system modification once the system has been installed as well as high cost of wiring. That is, each field location must be designed for a specific address thereby increasing inventory and installation time; and, if at any time additional field locations are desired to expand the system beyond the original design, additional wires are required to be installed.

The basic prerequisites of a commercially acceptable monitoring system are the capability of monitoring a great number of points, alarm and status monitoring of points, monitoring speeds compatible with computer speeds, point verification, modular components to reduce inventory, internal fault indication, economy of installation, and ease and economy of system modification. None of the prior proposed monitoring systems have satisfied these prerequisites even though this field is particularly active and much effort has been expended toward the provision of a monitoring system having the above-mentioned prerequisites.

Due to the potential danger in permitting alarm conditions to exist, a monitoring system must have integrity, and safety features must be provided to prevent the missing of an alarm condition due to system failure. Conventional monitoring systems have attempted to provide these features by increasing the circuit complexity and increasing the number of circuits and components; however, these attempts have succeeded only in substantially increasing costs and the opportunities for system failures.

SUMMARY OF THE INVENTION

Accordingly it is an object of the present invention to provide a sequential monitoring system requiring a number of wires independent of the number of points to be monitored.

Another object of the present invention is to permit an original monitoring system to be expanded without the necessity of running additional wires from the control center.

A further object of the present invention is to utilize a stage of a shift register in each field encoder of a monitoring system to permit sequential scanning.

The present invention has another object in that a sequential monitoring system is capable of finding a field encoder exhibiting an alarm condition quickly and on a priority basis.

Another object of the present invention is to count the acknowledge pulses from a plurality of field encoders to determine the field encoder being monitored.

A further object of the present invention is to provide an internal acknowledge pulse if no acknowledge pulse is received from a field encoder in order to continue a scan when an internal fault occurs.

Another object of the present invention is to utilize similar field encoders at each field point to reduce inventory.

Some of the advantages of the present invention are that the monitoring system is flexible to permit system modification such as the addition of field points with minimum effort and cost and without the necessity of new wires connected with the control center, that the speed of operation is compatible with computer speeds permitting the scanning of 200 points per second, that the monitoring system is relatively simple and inexpensive, and that the inventory of components is small thereby reducing costs.

The present invention is generally characterized in a sequential monitoring system including a control center having control means for generating shift pulses, a plurality of field encoders each having a shift register stage and means for generating signals in accordance with conditions to be monitored, and cable means interconnecting the control center and the field encoders to supply the shift pulses to each of the field encoders and to supply the condition signals to the control center.

Other objects and advantages of the present invention will become apparent from the following description of the preferred embodiment as shown in the accompanying drawings.

DESCRIPTION OF THE PREFERRED EMBODIMENT

Figure 1:
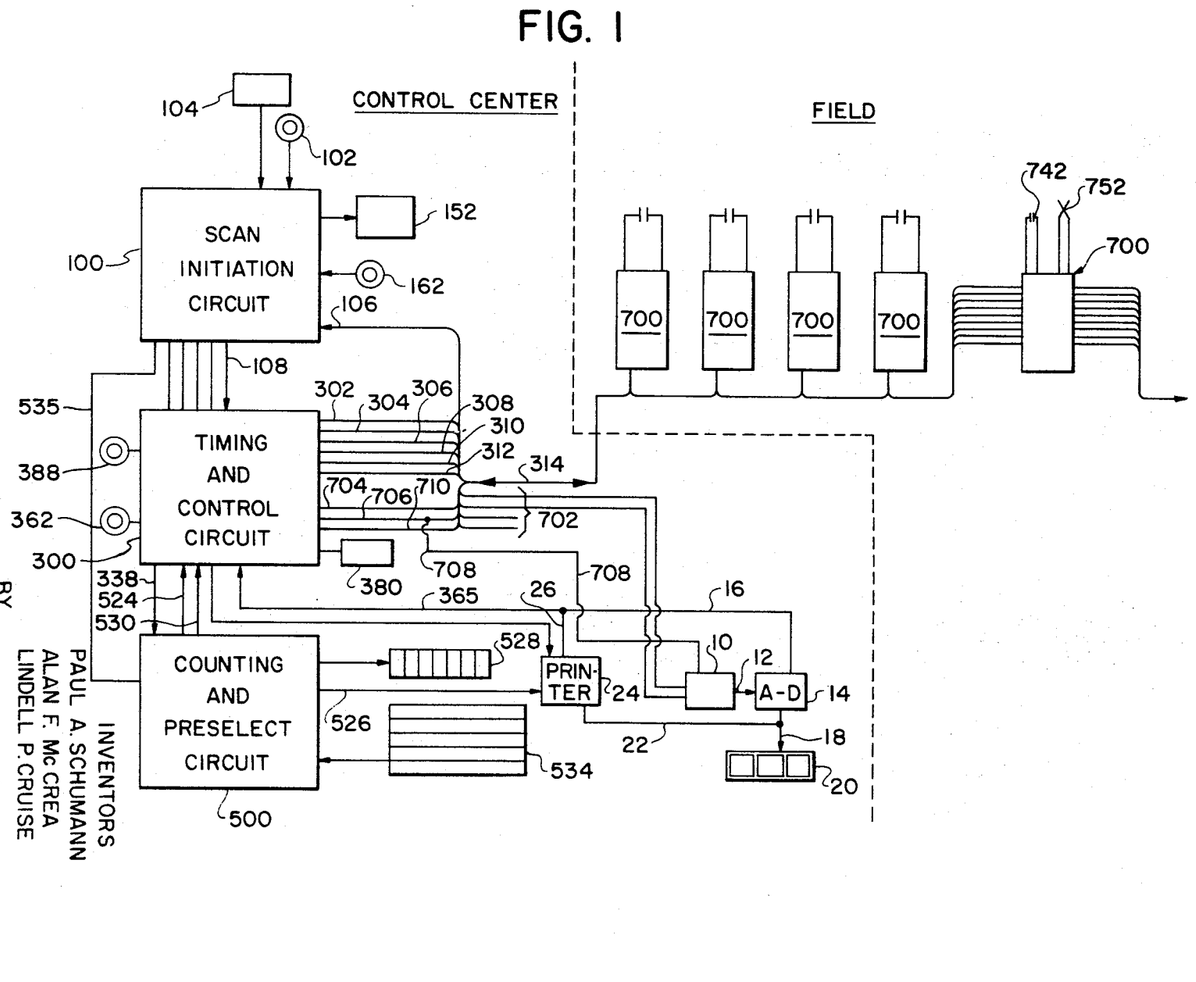
FIG. 1 is a schematic diagram of the monitoring system of the present invention.

A monitoring system according to the present invention is illustrated in block diagram in FIG. 1 and includes as basic components a scan initiation circuit 100, a timing and control circuit 300, a counting and preselect circuit 500, and a plurality of field encoders 700.

In order to facilitate understanding of the present invention, a summary of the operation of the monitoring system will be presented with respect to FIG. 1 prior to the detailed description of the circuitry illustrated in FIGS. 2 through 6.

Field encoders 700 are positioned in field locations to permit monitoring of any desired conditions and are connected in series thereby requiring only the number of wires necessary to receive and transmit desired data. Circuits 100, 300 and 500 are located at a control center to provide monitoring of a great number of points from a single location.

Each field encoder 700 includes a stage of a shift register, and field encoders 700 are interrogated or scanned sequentially by pulses from circuit 300. A scan initiation pulse is received by circuit 300 from circuit 100 and may be generated in response to any suitable scan requesting apparatus such as a manual push button switch 102 or a timer 104 which periodically requests scans. A scan may also be requested by an alarm signal on line 106 from the field transmitted by one of encoders 700.

Scan initiation circuit 100 includes priority and interrupt circuitry in order to interrupt a scan in progress when a higher priority scan request is received. The priority of scan requests may be in any order desired; however, by way of example, the system will be described with the highest level of priority being given to alarm signals from the field on wire 106, the second highest level of priority being given to manual scan requests from switch 102, and the next level of priority being given to the periodic scan requests from timer 104 with the realization that lower or higher priority scan requests may be added as desired. Memory means is provided in circuit 100 to retain scan request data while higher priority scans are in progress and when a scan is interrupted to permit a higher priority scan.

Scan initiation pulses are supplied to circuit 300 through an output line 108 from circuit 100, and circuit 300 generates set control, clear control, shift, field clear, point override and reset pulses on wires 302, 304, 306, 308, 310 and 312, which pulses are applied to encoders 700 in the field through a cable 314. Function, alarm, alarm identification, clear identification, point type and acknowledge signals are transmitted over wires 702, 106, 704, 706, 708 and 710, respectively, in cable 314 from encoders 700 in the field to the control center. The alarm signals are applied to circuit 100 on wire 106, as previously mentioned, and the alarm identification pulses, the clear identification pulses and the acknowledge pulses are applied to circuit 300. The point type pulses on wire 708 are applied to a signal conditioning circuit 10 which also receives function signals from wires 702, and the output 12 from circuit 10 is applied to an analog-to-digital converter 14 that supplies an output 16 to circuit 300, an output 18 to a visual readout device 20 and an output 22 to recording means such as a printer 24 or a typewriter or tape punch. Printer 24 has an output 26 indicating that the printer is in operation, and output 26 is connected with output 16 from converter 14.

Counting and preselect circuit 500 receives and counts acknowledge pulses from circuit 300 on line 338, and the count in circuit 500 indicates the field encoder being monitored. An output 526 from the counting circuitry is connected with printer 24 such that any data recorded will have a count associated therewith which coincides with the field encoder being monitored. Another output from the counting circuitry is connected with a visual readout device 528 to permit a visual indication of the number of the field encoder being monitored at any time. An input to circuit 500 is derived from preselect circuitry 534 in order to stop a scan at any preselected field encoder by providing a pulse to circuit 300 on line 524, and circuit 500 provides an end-of-scan pulse on line 530 to circuit 300 when a scan is completed. An input is also received by circuit 500 on line 535 from circuit 100 in order to prevent generation of a preselect signal when any scan level other than the scan level associated with preselect operation is in operation. For illustrative purposes, push button switch 102 is utilized to initiate preselect operation.

In operation, a scan may be requested from either an alarm signal on wire 106, or from switch 102 or timer 104, and assuming no scan to be in progress, scan initiation circuit 100 will cause a scan initiation pulse to be provided to timing and control circuit 300 through line 108. Circuit 300 provides a field clear pulse on wire 308 to clear the shift register stages in field encoders 700 and then provides set control and clear control pulses on wires 302 and 304, simultaneously. These control pulses are shifted to successive field encoders by shift pulses provided by circuit 300 on wire 306, and the field encoders are energized sequentially in accordance with the receipt of the set control and clear control pulses and a shift pulse at the inputs of the shift register stages. After each field encoder 700 is energized it provides an acknowledge pulse on wire 710 which is received by circuit 300 and utilized with a gating circuit to provide the next succeeding shift pulse. Acknowledge pulses are also supplied to counting circuit 500 so that the count in the counting circuit is an indication of the field encoder being monitored.

If an alarm condition exists at any field encoder, it is identified by a pulse on wire 704 when that field encoder is energized, and this alarm identification pulse is supplied to circuit 300 to stop the scan in order to permit sufficient time for conditions at that field encoder to be monitored on wires 702. Analog signals corresponding to conditions to be monitored are supplied through wires 702 and signal conditioning circuit 10 to analog-to-digital converter 14, and the signals are converted digitally to provide a digital visual output at 20 and to provide an output for recording at printer 24 through output line 22. While the converter 14 and/or the printer 24 are in operation, they provide a signal to circuit 300 to prevent the further generation of shift pulses, and after converter 14 and printer 24 have ceased operation, circuit 300 acts to generate a next shift pulse to continue the scan of the field encoders.

If any field encoder 700 should have an internal fault such that it fails to generate an acknowledge pulse upon energization, after a predetermined time circuit 300 will generate an internal acknowledge pulse to permit continuation of the scan. After the generation of an internal acknowledge pulse, printer 24 is operated to record the number of the faulty field encoder and data corresponding to failure to generate an acknowledge pulse. A predetermined time after the internal acknowledge pulse is generated, the circuit 300 generates a point override pulse on wire 310 which actuates bypass circuitry in the field encoder to permit the set control and clear control pulses to bypass the faulty shift register stage and be applied to the next shift register stage.

If a specific field encoder is desired to be monitored, the number of that field encoder may be inserted into preselect circuit 534 and once counting circuit 500 has counted a number of acknowledge pulses equal to the number of the preselected field encoder, a signal will be provided from counter 500 to circuit 300 to stop the scan and permit conditions at the field encoder to be recorded as previously described.

At the end of a scan counting circuit 500 will provide an end-of-scan pulse to circuit 300 which acts to reset the circuit to prepare it for the next scan as requested by scan initiation circuit 100 which also receives the end-of-scan pulse to permit the generation of a scan initiation pulse in accordance with the next highest priority scan request.

If during a scan an alarm signal is received on wire 106 from one of the field encoders 700, the priority circuitry in circuit 100 will store the alarm signal if the scan in progress was initiated by an alarm signal from the field. However, if the scan in progress was initiated by switch 102 or timer 104, circuit 100 will act to interrupt the scan in progress by generating a synthetic end-of-scan pulse and will initiate a new scan in order to detect the alarm condition. The interrupted scan is recorded, and once the alarm scan is completed the interrupted scan may be completed.

The above description of operation of the present invention is general in nature and is provided in order to facilitate the detailed description of the circuitry and operation that follows.

The components utilized in the circuitry of the present invention are conventional and comprise standard bistable circuits or flip-flops having set and reset inputs and Q and $\bar{Q}$ outputs; and toggle flip-flops having set, clear, direct clear and toggle inputs and Q and $\bar{Q}$ outputs. In their normal or quiescent states the Q outputs of the flip-flops will be at a low or "0" state and the $\bar{Q}$ outputs will be at a high or "1" state.

The standard flip-flops change state in response to a "0" at either the set or reset terminals, and the toggle flip-flops are operated to pass the set and clear inputs on the trailing edge of a "1" at the toggle input.

The conventional monostable multivibrators utilized have outputs designated at Q and/or $\overline{Q}$ and the outputs have the same quiescent states as described with respect to the flip-flops. The input to each monostable multivibrator is designated A or C in order to indicate on which edge of a pulse the monostable multivibrator is to be triggered. A multivibrator having an A input is triggered on the downward edge of a pulse; that is, the leading edge of an "0" or the trailing edge of a "1." Conversely, the C input of a multivibrator is triggered on an upward edge of a pulse; that is, the trailing edge of a "0" or the leading edge of a "1."

The logic gates utilized are conventional NANDs and exclusive ORs. The NANDs operate to provide a "0" output when all inputs are "1" and a "1" output at all other times. The two-input exclusive ORs operate to provide a "1" output when one input is a "0" and the other input is a "1," and at all other times a "0" output is provided.

SCAN INITIATION CIRCUIT

Figure 2:
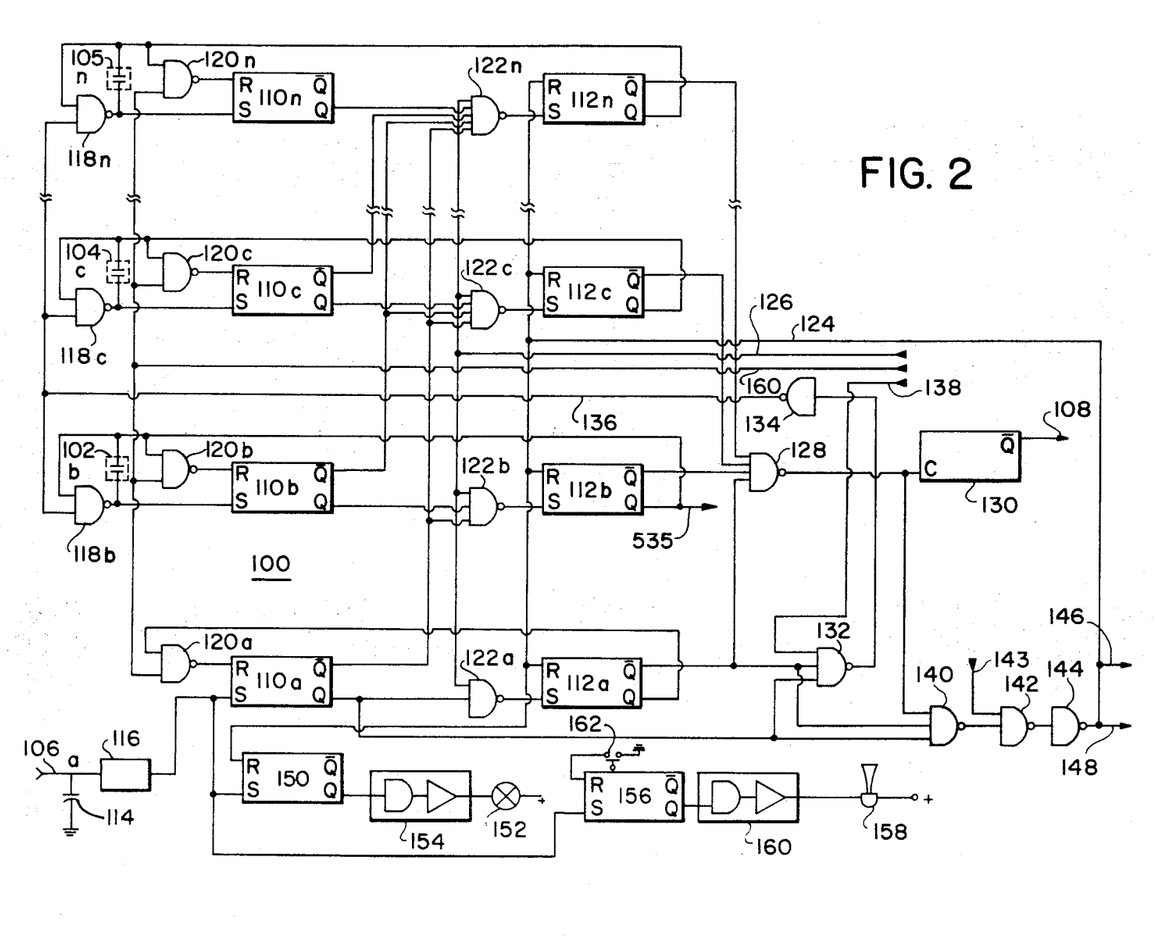
FIG. 2 is a schematic diagram of the scan initiation circuit of FIG. 1.

The scan initiation circuit 100 is illustrated in FIG. 2 and any number of priority level scans may be utilized with circuit 100 as will be explained hereinafter.

Four priority levels are identified in order of their priority as "a," "b," "c" and "n" with the realization that any number of priority levels may be utilized by connecting circuitry in the manner shown in FIG. 2.

For purposes of explanation the highest priority level a is illustrated as responsive to alarm signals from field encoders 700 on wire 106. The second priority level b is responsive to actuation of push button switch 102, and the third priority level c is responsive to the periodic requests from timer 104. Actuation means 105 is illustrated for the lowest level n with the realization that any means may be utilized therefor.

The circuitry of each priority level includes a memory flip-flop 110 and an active level flip-flop 112. An integrating capacitor 114 is connected between wire 106 and ground and shunts high frequency noise while permitting an alarm signal on wire 106 to be supplied to the input of a Schmitt trigger 116 which has its output connected with the set input of flip-flop 110a. The combination of capacitor 114 and Schmitt trigger 116 operate to assure that a scan commenced in response to a signal on line 106 is initiated only from a proper alarm signal and not from noise. The set inputs of flip-flops 110b, 110c and 110n are connected to actuating means 102, 104 and 105, respectively, which are shown as open contacts, and also to an input NAND 118. The reset inputs of flip-flops 110 in each priority level are connected to a memory reset NAND 120.

A plurality of priority NANDs 122 having an increasing number of inputs are connected to the set input of each active level flip-flop 112, and the reset input of each flip-flop 112 is connected to a line 124 which has a signal thereon indicating the end of a scan as a "0" as will be explained hereinafter.

The Q output of each memory flip-flop 110 is connected to the input of its corresponding priority NAND 122, and the $\overline{Q}$ output of each memory flip-flop 110 is connected as an input to the priority NAND 122 of each succeeding priority level exclusive of the priority NAND in its corresponding priority level. The remaining input to each priority NAND 122 is supplied from line 126 which has a signal thereon indicating that a scan is in progress by a "0" and that no scan is in progress by a "1." The Q output of each active level flip-flop 112 is connected as an input to its associated memory reset NAND 120, and in levels b, c and n, the Q output of active level flip-flop 112 is also connected to input NAND 118 and actuators 102, 104 and 105. A Q output of active level flip-flop 112b is also connected with line 535 to provide an inhibit signal to NAND 522 when any priority level other than level b is in operation.

The $\overline{Q}$ output of each active level flip-flop 112 is connected to a NAND 128 which has its output directly connected to the C input of a monostable multivibrator 130. The $\overline{Q}$ output from multivibrator 130 provides a scan initiation pulse "0" on line 108 to timing and control circuit 300 to initiate a scan. The $\overline{Q}$ output of active level flip-flop 112a is also connected to a NAND 132 which has its output inverted at 134 and applied along line 136 to the remaining input at each of input NANDs 118. NAND 132 has an input from line 138 which has a signal therein indicating the "in scan" status of the timing and control circuitry 300 by "1" and an input from the Q output of memory flip-flop 110a. A NAND 140 has an input connected with the Q output of flip-flop 110a, an input connected with the $\overline{Q}$ output of flip-flop 112a and an input connected to the output of NAND 128. The output of NAND 140 is utilized as an input to a NAND 142 along with an end-of-scan pulse on an input 143. The output of NAND 142 is inverted at 144 and applied as a clear signal to the counting circuit 500 on line 146, to be described hereinafter, to line 124 as a synthetic end-of-scan pulse, and on line 148 to timing and control circuit 300.

A field alarm annunciator circuit is connected to the output of Schmitt trigger 116 and includes a flip-flop 150 receiving the output from Schmitt trigger 116 at its set input and having its reset input connected to line 124. The Q output of flip-flop 150 is utilized to energize a visual annunciator such as a light 152 through a conventional power driver 154. A flip-flop 156 has its set input connected to the output of Schmitt trigger 116, and the Q output of flip-flop 156 is utilized to energize an audible annunciator such as a horn 158 through a conventional power driver 160. Horn 158 may be deenergized by actuating a push button 162 which provides a "0" to reset flip-flop 156.

The operation of the scan initiation circuit 100 will be described at this time so that only the scan initiation pulse output thereof need be discussed in describing the overall operation of the monitoring system.

Assuming no scan to be in progress and an alarm or clear condition exists at a field encoder, an alarm signal will be received on line 106 to trigger Schmitt trigger 116 to apply a "0" to the set input of flip-flop 110a. The setting of flip-flop 110a places a "1" on its Q output which is applied to priority NAND 122a and NAND 132. If no scan is in progress a "1" will be seen on line 126 thus providing a "0" at the output of priority NAND 122a to set flip-flop 112a to provide a "0" at the $\overline{Q}$ output of flip-flop 112a. When no scan is in progress all of the inputs to NAND 128 will be "1" thereby providing a "0" output; and, accordingly, when flip-flop 112a is set, the "0" at its $\overline{Q}$ output will cause NAND 128 to provide a "1" output to trigger monostable multivibrator 130 and provide a scan initiation pulse to timing and control circuit 300.

If a scan is in progress when an alarm signal from the field encoders 700 is received, a "0" will be seen on line 126 thereby blocking all priority NANDs 122, and the "1" at the Q output of flip-flop 110a is applied to NAND 132. Thus, since the priority level associated with the scan in progress is identified by its active level flip-flop 112 being in the set state, if the scan in progress is a first level a scan the Q output from flip-flop 112a will be "0" thereby inhibiting an output from NAND 132. Once the first level priority scan in progress has ended and the scan initiation circuitry has been reset by a short "0" end-of-scan pulse on line 124 from input 143 of NAND 142, the field alarm condition will then initiate another first level priority scan due to the storage of the alarm signal in memory flip-flop 110a.

If the scan in progress is not a first priority level scan, all three inputs to NAND 132 will be "1's," and the "0" output therefrom will be inverted at 134 and applied to input NANDs 118 of priority levels b, c and n. Furthermore, all the inputs to NAND 140 will be "1's" thereby placing a "0" at its output which passes through NAND 142 and is inverted at 144 to provide a synthetic "0" end-of-scan pulse to line 124 to reset all of the active level flip-flops 112 and interrupt the scan. The priority level of the scan in progress will be identified by the "0" $\overline{Q}$ output of its active level flip-flop 112, and due to the "1" at one input of input NANDs 118 from line 136, that priority level which initiated the scan in progress will have "1's" at both inputs of its input NAND 118 to thereby set its associated memory flip-flop 110 so that once the first level priority level scan is completed, the system may return to finish the interrupted scan. The output signal from NAND 144 is also applied to the timing and control circuit 300, as described hereinafter, to interrupt the scan in progress thereby altering the signals on lines 138 and 126 to indicate that no scan is in progress and thereby permitting priority level $a$ to activate monostable multivibrator 130 in the manner previously described to initiate a new scan. Once this new scan is finished if no higher priority demands have been received, the scan stored in appropriate memory flip-flop 110 will commence.

A memory reset "1" pulse from timing and control circuit 300 is applied along line 160 to the remaining input of each of memory reset NANDs 120 a short time after a scan initiation pulse is generated on line 108 to reset the memory flip-flop 110 thereby permitting new scan requests to be stored in the memory flip-flop.

Due to the priority NANDs 122 receiving inputs from each higher priority level, a scan will not be initiated in response to a lower priority level scan request unless none of the higher priority levels contain a scan request in storage in memory flip-flops 110; however, if there is no higher priority level scan request, the lower priority level scan request will cause a scan initiation pulse to be generated by multivibrator 130 in the same manner as previously described with respect to priority level $a$.

Interrupt circuitry similar to the interrupt circuitry comprising NANDs 132 and 140 associated with priority level $a$ may be used with other priority levels if desired with logic circuitry to prevent the interruption of a higher priority level scan by a lower priority level scan request. Specifically, a priority level with interrupt circuitry may be added for clear signals from field encoders 700 whereby the alarm and clear conditions indicated on wire 106 are separated with the highest priority given to alarm signals.

TIMING AND CONTROL CIRCUIT

Figure 3:
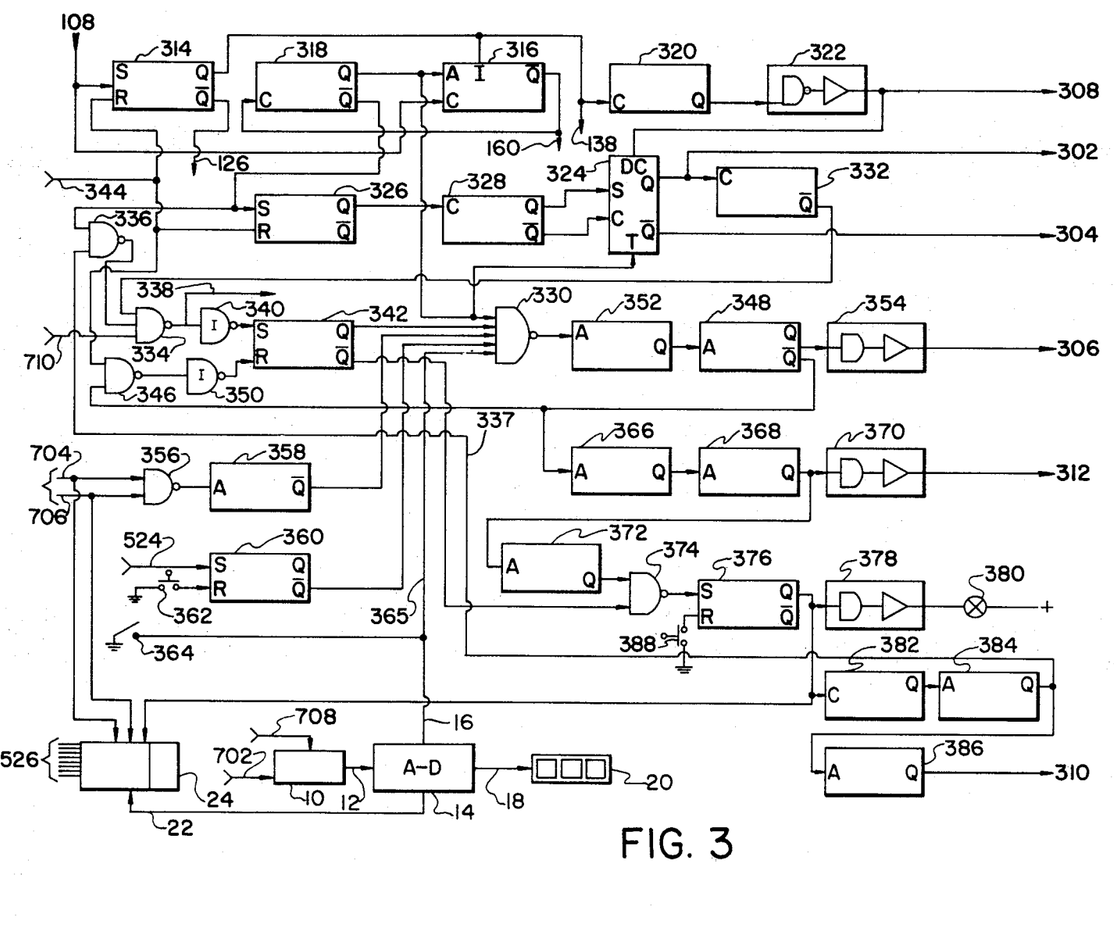
FIG. 3 is a schematic diagram of the timing and control circuit of FIG. 1.

The timing and control circuit 300 is shown in FIG. 3 and has an input for receiving a scan initiation pulse on line 108 from the output of monostable multivibrator 130 of scan initiation circuit 100. The "0" pulse on line 108 is applied to the set input of a flip-flop 314 to provide a "1" at its Q output which is supplied to line 138 of FIG. 2 indicating that a scan is in progress. Correspondingly, a "0" is provided on the $\overline{Q}$ output of flip-flop 314 and is supplied to line 126 in FIG. 2 indicating that a scan is in progress. The Q output of flip-flop 314 is connected with an I input of a monostable multivibrator 316, and a "0" at input I acts to inhibit the operation of monostable multivibrator 316. A monostable multivibrator 318 is connected in loop fashion with multivibrator 316 such that the Q output of multivibrator 318 is applied to the A input of multivibrator 316, and the $\overline{Q}$ output of multivibrator 316 is applied to the C input of multivibrator 318. The $\overline{Q}$ output of multivibrator 316 is also applied to line 160 as a delayed memory reset pulse. The scan initiation pulse on line 108 is applied to the C input of multivibrator 316 in order to trigger the multivibrator to thereby start an oscillatory clocking operation between multivibrators 316 and 318.

Output Q of flip-flop 314 is also applied to the C input of a monostable multivibrator 320 which has a Q output connected through a power driver 322 to line 308 to supply a field clear pulse to the direct clear inputs of each shift register stage in each field encoder 700 and also to the direct clear input of a toggle flip-flop 324 in the timing and control circuit.

The $\overline{Q}$ output of multivibrator 318 is applied to the set input of a flip-flop 326 which has its Q output connected to the C input of a monostable multivibrator 328. The complementary Q and $\overline{Q}$ outputs of multivibrator 328 are applied to the set control and clear control inputs of toggle flip-flop 324, respectively. The Q output of toggle flip-flop 324 is utilized to apply a set control signal on line 302 to field encoders 700, and the $\overline{Q}$ output of toggle flip-flop 324 is utilized to apply a clear control signal on line 304 to field encoders 700. The Q output of multivibrator 318 is connected to the toggle input of flip-flop 324 and to a NAND gate 330.

A synthetic acknowledge pulse is derived from a monostable multivibrator 332 that has a C input connected to the Q output of toggle flip-flop 324 and a $\overline{Q}$ output connected as one input of a three-input NAND 334. A second input of NAND 334 receives acknowledge pulses on line 710 from field encoders 700, and the third input of NAND 334 is derived from a two-input NAND 336 that has as one input the $\overline{Q}$ output of multivibrator 318. The second input of NAND 336 is connected with a line 337 to receive internal acknowledge pulses from circuitry to be described hereinafter.

The output of NAND 334 is supplied on line 338 to counting circuit 500 to be described hereinafter, and is also inverted at 340 and applied to the set input of a flip-flop 342 which has its Q output applied as a second input to NAND 330.

A line 344 receives actual and synthetic end-of-scan pulses on line 148 from scan initiation circuit 100 of FIG. 2 indicating the completion of a scan. Line 344 is connected to the reset inputs of flip-flops 314 and 326 and to one input of a two-input NAND 346 which derives its second input from the $\overline{Q}$ output of a monostable multivibrator 348. The output of NAND 346 is inverted at 350 and applied to the reset input of flip-flop 342.

The output of NAND 330 is applied to an A input of a monostable multivibrator 352 which has its Q output connected to the A input of monostable multivibrator 348. The Q output of multivibrator 348 is applied to field encoders 700 through a power driver 354 as a shift pulse on line 306.

The alarm identification pulse on line 704 and the clear identification pulse on line 706 from field encoders 700 are applied to a NAND 356 having an output applied to the A input of a monostable multivibrator 358 which has a $\overline{Q}$ output connected as a third input to NAND 330. The pulse generated by multivibrator 358 has a time delay of approximately 100 ms. such that multivibrator 358 acts as a timing means to permit sufficient time to record data from field encoders 700 and counting circuit 500, as will be explained hereinafter. A fourth input to NAND 330 is derived from a $\overline{Q}$ output of a flip-flop 360 which receives at its set input on a line 524 a signal from counting circuit 500 indicating a preselected count has been reached, as will be described hereinafter. The reset input of flip-flop 360 is connected to ground through a push button switch 362 which acts to reset flip-flop 360 and permit the system to resume counting after counting has been stopped by a signal applied to the set input of flip-flop 360.

Alarm identification wire 704 and clear identification wire 706 are connected to printer 24 which also receives an input 526 from counting circuit 500 to record the number of a field encoder from which an alarm or clear identification signal is derived. A contact within printer 24 is illustrated at 364 and is closed when the printer is in operation to provide a fifth input on line 365 to NAND 330. The fifth input to NAND 330 on line 365 is also connected with output 16 from analog-to-digital converter 14 which provides a visual output at 20 from output 18 and an output 22 to be recorded at printer 24. Converter 14 is designed to perform only one conversion of an analog signal during normal operation, and after the conversion is completed a "1" is applied to line 365.

Wire 708 from the field is connected with signal conditioning circuit 10 to indicate the type of condition being represented in analog form from the field. Circuit 10 is conventional and is designed to provide an output that is always in the same range by amplifying or attenuating the analog signals on wires 702 in accordance with the sensing means utilized, as indicated on wire 708. The analog signals from circuit 10 are applied through a line 12 to converter 14.

The $\overline{Q}$ output of multivibrator 348 is delayed by two monostable multivibrators 366 and 368 and is applied to field encoders 700 through a power driver 370 to provide a reset pulse on wire 312. The Q output of monostable multivibrator 368 is connected to the A input of a monostable multivibrator 372 which has its Q output connected as one input of a two-input NAND 374 that receives a second input from the $\overline{Q}$ output of flip-flop 342, and the output of NAND 374 is connected to the set input of a flip-flop 376 that has a Q output connected through a power driver 378 to energize a visual internal fault annunciator 380 such as a light. The Q output of flip-flop 376 is also connected to line 337 through two monostable multivibrators 382 and 384 to provide an internal acknowledge pulse to NAND 336, and the Q output of multivibrator 384 is connected to wire 310 through a monostable multivibrator 386 to provide a point override pulse to field encoders 700. The reset input to flip-flop 376 is connected to ground through a push button switch 388 in order to permit reset of flip-flop 376 and deenergization of annunciator 380.

COUNTING AND PRESELECT CIRCUIT

Figure 4:
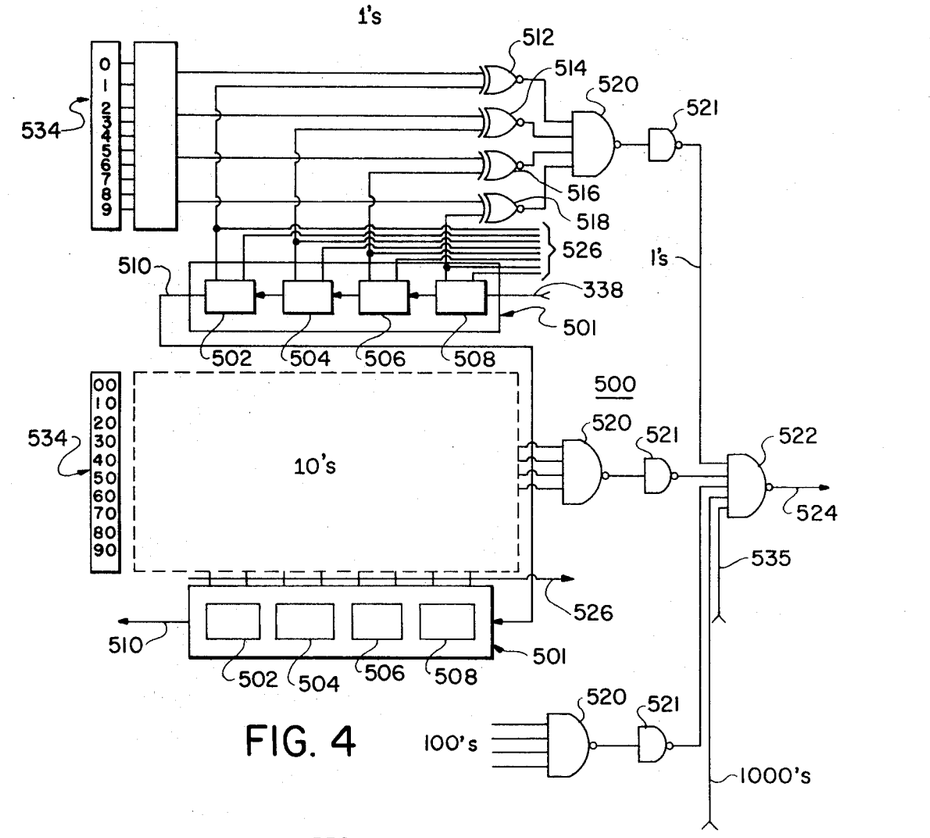
FIGS. 4, 4a and 5 are schematic diagrams of the counting and preselect circuit of FIG. 1.
Figure 4A:
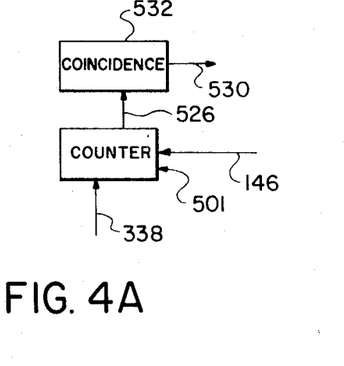
Figure 5:
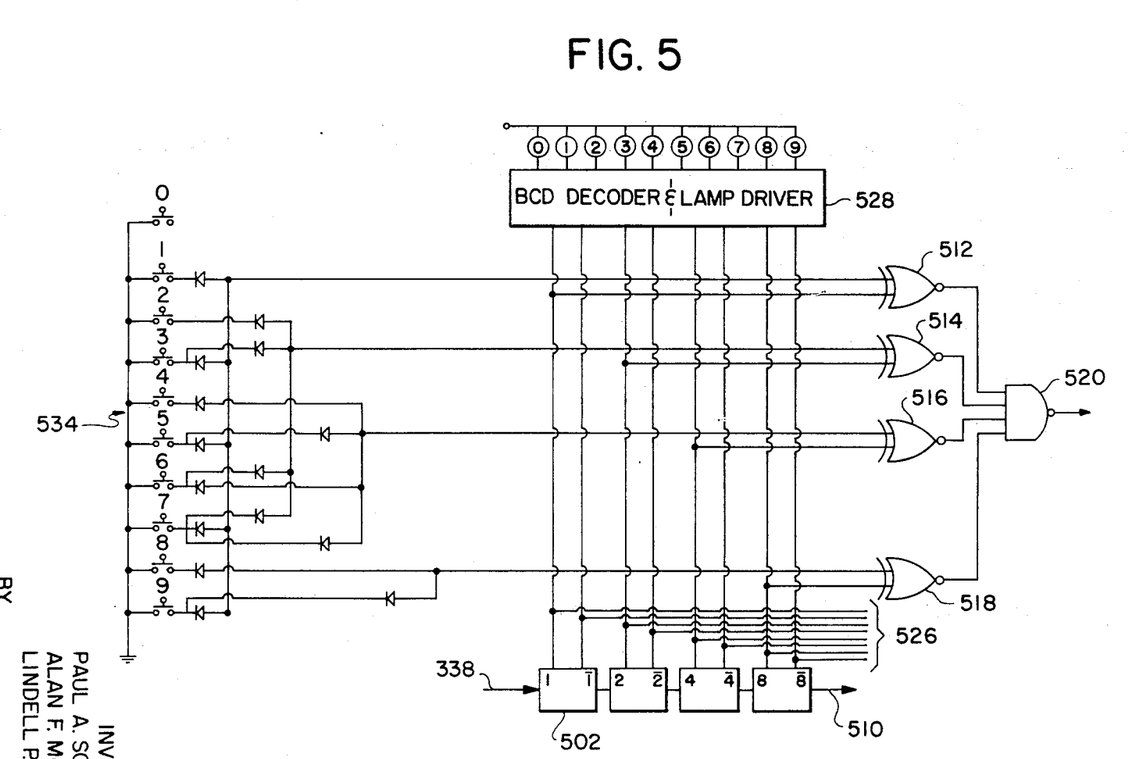

The counting and preselect circuit 500 is illustrated in FIGS. 4, 4A and 5; however, a detailed description and operational explanation of the decade counters utilized in circuit 500 is not included herein since decade counters are well known in the art.

The counting circuitry is illustrated as including a "1's" portion and a "10's" portion with parts of "100's" and "1,000's" portions. Each portion of the counting circuitry includes a binary coded digital decade counter 501 composed of four flip-flop stages 502, 504, 506 and 508 which are interconnected to provide a pulse on a carry output line 510 after ten pulses are received by the counter. The "1's" portion of the counter receives pulses on line 338 from timing and control circuit 300 and the other portions receive pulses on the carry line 510 of the counter in the preceding portion. A pulse will be provided on line 338 each time either a synthetic acknowledge pulse or an internal acknowledge pulse is produced by timing and control circuit 300 or an acknowledge pulse is received on line 710 from field encoders 700 due to the operation of NAND 334; and, thus, the number of pulses applied to the counting circuit will indicate the field encoder being monitored. Each of the "1's," "10's," "100's" and "1,000's" portions is the same, and as many portions as may be required may be utilized.

In order to permit a specific field encoder 700 to be monitored, preselect circuit 534 is provided with a plurality of push button switches associated with each portion of the counting circuit such that the number of the specific field encoder to be monitored may be selected by pushing the corresponding buttons associated with the various portions. As shown in FIG. 5, actuation of the push button switches having numbers corresponding to the number of the preselected field encoder provides pulses to a plurality of two-input exclusive ORs 512, 514, 516 and 518 which have their outputs connected to a four-input NAND 520. The second input of the exclusive ORs is derived from the stages of the decade counter; and, thus, an output will be received from NAND 520 only when the conditions of all four exclusive ORs are satisfied by the actual count equaling the number of the preselected field encoder. The circuitry shown in FIG. 5 is the same for each portion, and the outputs of NANDs 520 are supplied through an inverter 521 to a NAND 522 having as many inputs as there are portions in the counting circuit. Input 535 to NAND 522 supplies a "0" to inhibit the outputting of a preselect signal when any scan level other than that associated with preselect operation is in operation. The output 524 of NAND 522 is supplied to the set input of flip-flop 360 in timing and control circuit 300 to interrupt the scan by inhibiting NAND 330.

The logic circuitry utilized to provide proper signals in order to yield an output indicating that the preselected field encoder is being monitored, as illustrated in FIG. 5, includes a plurality of interconnected diodes which are arranged to apply a "0" to one input of the exclusive ORs in order that they may properly operate to provide an output from NAND 520 when the preselected count is reached.

The output 526 in digital form from the four stages within each counting portion is applied to printer 24 in order to print information identifying a field encoder by number along with any information obtained such as conditions monitored and internal faults. Output 526 is also supplied to a binary coded digital decoder and lamp driver 528 in order to visually display the number of the field encoder being monitored at any time.

When all field encoders have been scanned an end-of-scan signal is provided by either the use of a system similar to the preselect circuitry above described having the total number of field encoders to be scanned as the preselected number, or a coincidence circuit may be utilized indicating that all points have been scanned as illustrated in block diagram form in FIG. 4A. The end-of-scan pulse on line 530 from coincidence circuit 532 is supplied to input 143 of scan initiation circuit 100 to provide end-of-scan pulses on line 124 to reset the scan initiation circuit, on line 146 to clear the counter, and on line 148 to reset the timing and control circuit for the next scan.

FIELD ENCODERS

Figure 6:
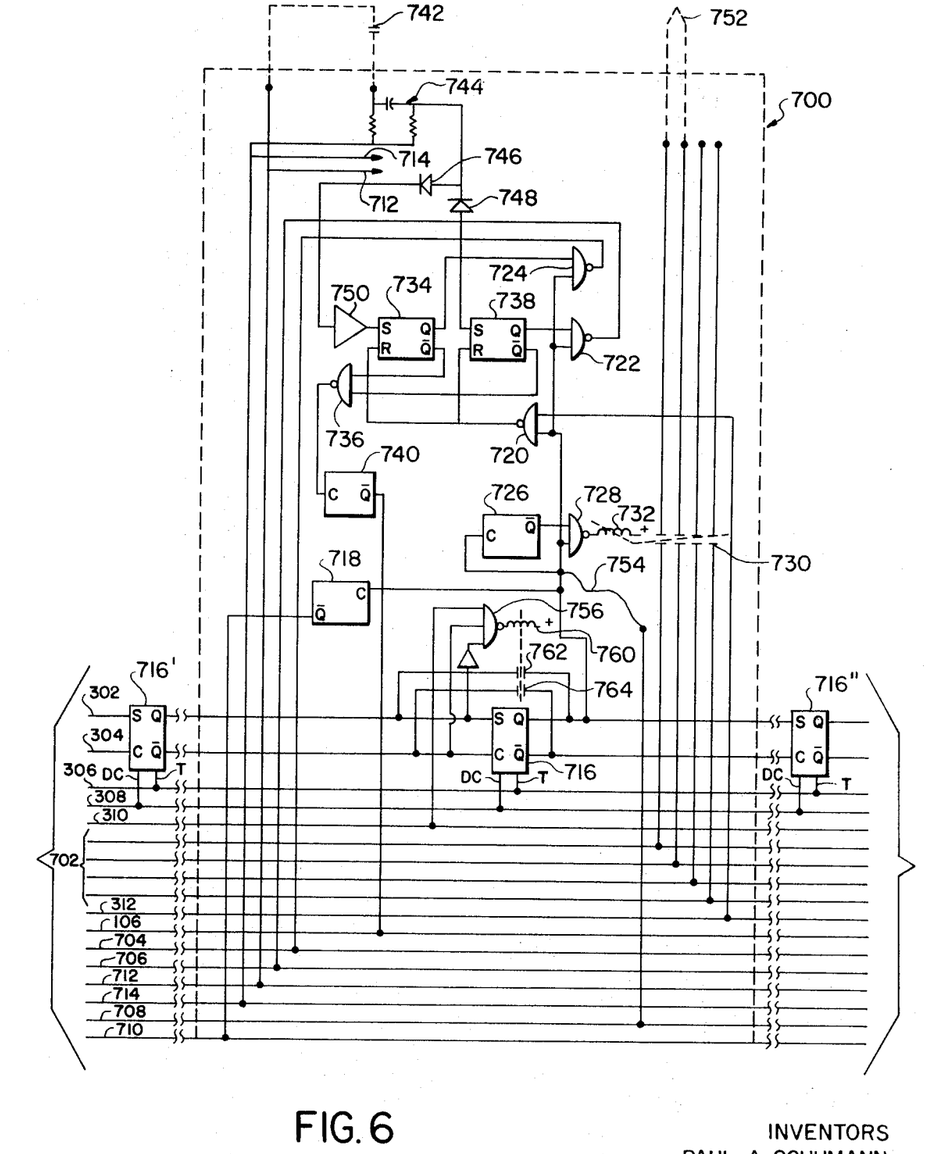
FIG. 6 is a schematic diagram of a field encoder of FIG. 1.

A typical field encoder 700 is shown in FIG. 6 and it is noted that each field encoder will have the same basic circuitry therein with the provision that the conditions sensed may differ. Cable 314 includes a positive bus 712 and a ground bus 714 along with the previously mentioned wires in order to provide proper biasing for the components of the field encoders. Buses 712 and 714 are not illustrated as being connected with the field encoder components in order to simplify understanding of the present invention with the realization that such connections are conventional.

Each field encoder includes a shift register stage comprising a toggle flip-flop 716 having a set control input and a clear control input connected with the Q and $\overline{Q}$ outputs, respectively, of the toggle flip-flop 716 of the previous field encoder. The direct clear input of toggle flip-flop 716 is connected with wire 308 to receive field clear pulses, and the toggle input is connected with wire 306 to receive shift pulses. The Q output of toggle flip-flop 716 is connected with a C input of a monostable multivibrator 718 which has its $\overline{Q}$ output connected to wire 710 to provide an acknowledge pulse after toggle flip-flop 716 has been energized. The Q output of toggle 716 is also connected as one of the inputs of each of an alarm reset NAND 720, a clear NAND 722 and an alarm NAND 724 and is further connected with a C input of a multivibrator 726 which has its $\overline{Q}$ output connected along with the Q output of flip-flop 716 to a power NAND 728 to close a plurality of contacts 730 by energization of a coil 732.

The second input of alarm reset NAND 720 is connected with wire 312 to receive alarm reset pulses, and the output of alarm reset NAND 720 is connected with the reset input of a flip-flop 734. The Q output of flip-flop 734 is connected with the second input of alarm NAND 724, and the $\overline{Q}$ output of flip-flop 734 is connected as one input of a NAND 736 that has a second input connected with the $\overline{Q}$ output of a flip-flop 738. The output of NAND 736 is applied to a C input of a monostable multivibrator 740 which produces a pulse at its $\overline{Q}$ output as an alarm signal on wire 106. The reset input of flip-flop 738 is connected to the output of alarm reset NAND 720, and the Q output of flip-flop 738 is connected to the second input of clear NAND 722 which has its output connected to wire 706 to provide a clear identification pulse. The output of alarm NAND 724 is connected to wire 704 to provide an alarm identification pulse.

A pair of alarm contacts 742 are connected on one side with positive bus 712 and on the other side to ground bus 714 through an RC network 744 which is connected to the anode of a diode 746 and the cathode of a diode 748. The cathode of diode 746 is connected through an inverting amplifier 750 to the set input of flip-flop 734, and the anode of diode 748 is connected directly to the set input of flip-flop 738.

Wires 702 are connected across condition sensing means such as thermocouple 752 under the control of contacts 730. While there is illustrated only wires for two condition sensing means, any number of wires 702 may be provided dependent upon the maximum number of conditions to be sensed. Of course, any suitable conditions may be sensed such as temperature, humidity, pressure, flow or power, and a jumper 754 is provided in order to provide a signal on wire 708 indicating the type of condition being sensed so that signal conditioning circuit 10 provides analog-to-digital converter 14 with analog signals in the proper range. Jumper 754 is connected during installation and may be changed if the conditions to be sensed are changed thereafter, and as many indicator wires 708 as are desired may be utilized. Alarm contacts 742 are associated with the condition sensing means such that if any condition being sensed reaches an alarm state contacts 742 will close.

A bypass circuit for placing the set control and clear control signals on the Q and $\bar{Q}$ outputs of toggle flip-flop 716, respectively, includes a power NAND 756 having inputs connected to the set control input of toggle flip-flop 716 through an inverter 758, to the clear control input of toggle flip-flop 716, and to wire 310 to receive point override pulses. The output of NAND 756 is connected to a coil 760 which when energized closes contacts 762 and 764 to bypass toggle flip-flop 716.

OPERATION

Figure 7:
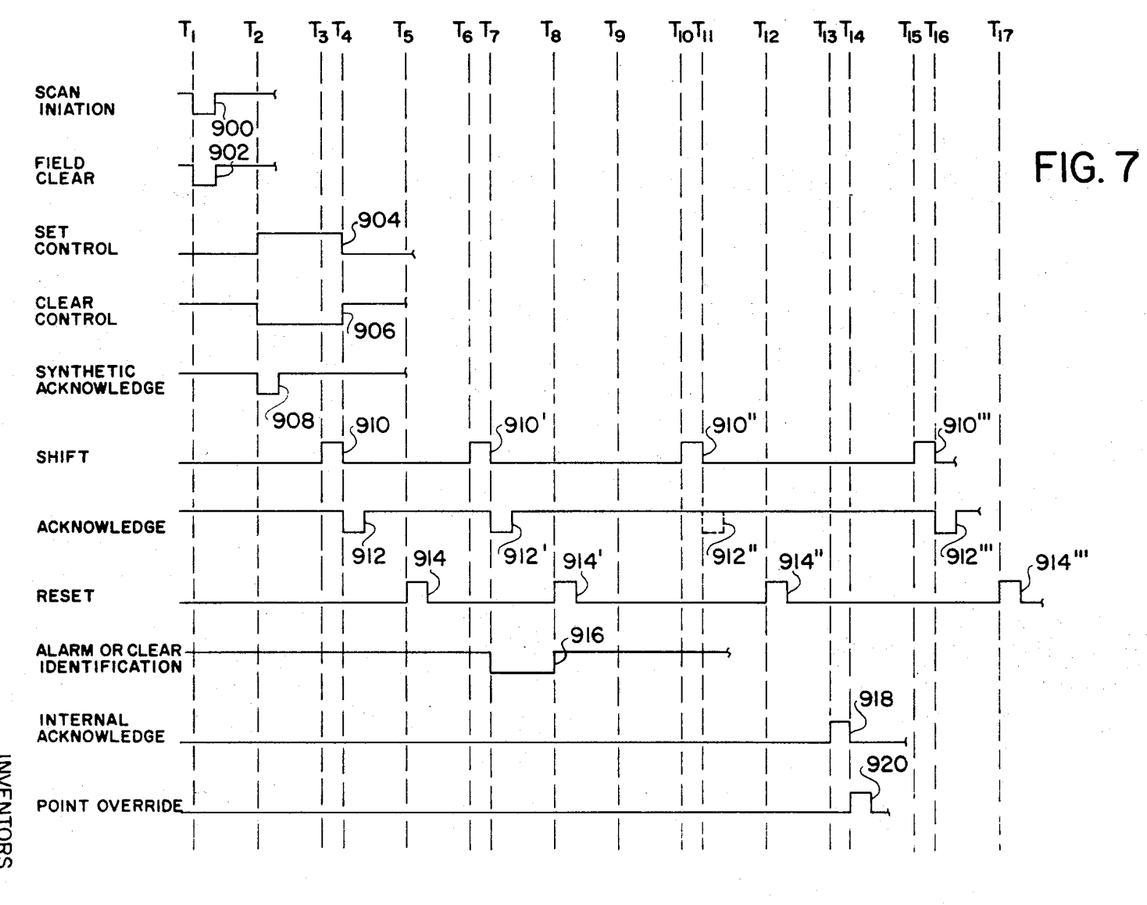
FIG. 7 is a timing chart for the system of FIG. 1.

The operation of the monitoring system will be described with the aid of FIG. 7 which is a timing diagram of the pulses of primary concern with respect to the system. Since the operation of scan initiation circuit 100 has been explained it will be assumed that proper scan initiation pulses are received therefrom and applied on line 108 to the timing and control circuit of FIG. 3 in order to facilitate an understanding of the present invention.

Assuming that a scan initiation pulse 900 on line 108 has been derived from scan initiation circuit 100 at time $t_1$, the operation of the system is as follows. Scan initiation pulse 900 on line 108 sets flip-flop 314 and commences clocking oscillation of looped multivibrators 316 and 318. A field clear pulse 902 is generated simultaneously with scan initiation pulse 900 at time $t_1$ by multivibrator 320 and applied through wire 308 to clear the shift register stage toggle flip-flop 716 in each field encoder 700 and is also applied to clear internal toggle flip-flop 324. A pulse from the $\bar{Q}$ output of multivibrator 318 sets flip-flop 326 which causes multivibrator 328 to apply complementary set control and clear control pulses to toggle flip-flop 324 and thereafter a "1" from the Q output of multivibrator 318 toggles flip-flop 324 to provide a set control pulse 904 and a clear control pulse 906 on wires 302 and 304, respectively, at time $t_2$. Multivibrator 332 responds to set control pulse 904 to provide a synthetic acknowledge pulse 908 at time $t_2$ which is gated by NAND 334 and inverted to set flip-flop 332 to provide a "1" at one input of NAND 330. At this time all other inputs to NAND 330 are in the "1" state since no preselected field encoder is being monitored, no alarm identification or clear identification pulses are present, analog-to-digital converter 14 is not in operation, printer 24 is not in operation and a "1" is received from the Q output of multivibrator 318. The "0" output of NAND 330 provides a shift pulse 910 at a time $t_3$ determined by multivibrators 352 and 348, which shift pulse 910 is supplied to the toggle input of the shift register stage toggle flip-flop 716 of each field encoder 700 on wire 306.

At this time the first field encoder 700 will be energized due to the provision at its set and clear inputs of set control pulse 904 and clear control pulse 906, respectively. An output is not provided from toggle flip-flop 716 until the end of shift pulse 910 at time $t_4$ at which time the Q output of toggle flip-flop 716 provides a "1" to multivibrator 718 to generate an acknowledge pulse 912 which is returned to timing and control circuit 300 on wire 710 and is gated by NAND 334 to flip-flop 342.

Each time multivibrator 348 provides a shift pulse 910 at its Q output it also provides a "0" at its $\bar{Q}$ output which is gated through NAND 346 and inverted to reset flip-flop 342; and, thus, when an acknowledge pulse 912 is received on line 710 from a field encoder, the acknowledge pulse is gated by NAND 334 to set flip-flop 342 in preparation for the generation of the next shift pulse 910 as previously described. The output from NAND 334 is also connected through line 338 to counting and preselect circuit 500 such that circuit 500 counts acknowledge pulses to indicate how many field encoders have been monitored and which field encoder is being monitored at any time.

The $\bar{Q}$ output of multivibrator 348 is also utilized to generate a reset pulse 914 at time $t_5$ a specified time after shift pulse 910 is generated in accordance with the time delay of multivibrators 366 and 368, and reset pulse 914 is applied to alarm reset NAND 720 of each encoder through wire 312 to reset flip-flop 734 and 738 after monitoring, as will be explained hereinafter.

If during a scan no alarm or clear conditions are found, each field encoder 700 will be rapidly scanned due to the shifting of set control pulse 904 and clear control pulse 906 to each field encoder 700 by shift pulses 910 without monitoring the analog signals from condition sensing means 752 due to the time delay of multivibrator 726, and at the completion of the scan an end-of-scan pulse will be generated by coincidence circuit 532 and applied to input 143 of scan initiation circuit 100 to reset circuits 100 and 300 and clear the counter, as previously described. The "0" output from Q of flip-flop 314 inhibits multivibrator 316 to stop the clock pulses provided thereby, and the timing and control circuit 300 is now ready to provide another scan of the field encoders 700. The pulses shown in FIG. 7 from times $t_2$ to $t_5$ will occur for each field encoder 700 with operation as described above with no existing alarm or clear conditions. It is noted that a clear condition exists at a field encoder only during the period between opening of alarm contacts 742 and the next monitoring of the field encoder.

If an alarm condition exists at a field encoder 700, when that field encoder is monitored an alarm identification pulse 916 will be generated by alarm NAND 724 and carried on wire 704 to be gated through NAND 356 to provide a "0" pulse of long duration from the $\bar{Q}$ output of multivibrator 358 to inhibit NAND 330. The alarm identification pulse 916 from alarm NAND 724 is generated due to the existence of a "1" at the Q output of flip-flop 734 and the "1" at the Q output of toggle flip-flop 716 after it is energized. Flip-flop 734 is set by the positive voltage applied by RC network 744 when alarm contacts 742 close which positive voltage is inverted and applied to the set input of flip-flop 734.

By providing multivibrator 726 with a pulse having a duration longer than the time between $t_4$ and $t_6$ signals from the condition sensing means such as thermocouple 752 will not be supplied to wires 702 unless NAND 330 is inhibited for some reason since NAND 728 will not be enabled. Thus, when no alarm or clear identification pulses 916 are generated by the field encoder being monitored by the time the $\bar{Q}$ output of multivibrator 726 returns to its "1" state, the Q output of toggle flip-flop 716 will be returned to "0" thereby preventing actuation of NAND 728.

The alarm identification pulse 916 provided by alarm NAND 724 is applied to printer 24 which records the receipt of an alarm identification pulse along with the number of the field encoder being monitored which is determined from the count on output 726 from the counting circuit, and the printer closes contact 364 to inhibit NAND 330 through a "0" on line 356 after timing multivibrator 358 has returned to its normal state. Due to the prolonged retention of a "1" on the Q output of toggle flip-flop 716, NAND 728 is energized and analog signals corresponding to the conditions sensed are supplied to wires 702 and applied through signal conditioner 10 to analog-to-digital converter 14 in accordance with the signal received on wire 708 indicating the conditions being sensed at the field encoder. Operation of converter 14 further provides a "0" to NAND 330 through line 365 to inhibit its operation. The output of converter 14 is supplied to printer 42 such that the digital value of the condition being sensed may be printed, along with the number of the field encoder and the alarm condition, and is also visually displayed at 20. Once this operation is completed the input on line 365 to NAND 330 returns to a "1" condition, and NAND 330 is enabled to cause the generation of a shift pulse 910 under the control of the clock pulse from the Q output of multivibrator 318 since the acknowledge pulse 912 from the field encoder is stored in flip-flop 342. Thus, once the conditions at the field encoder exhibiting an alarm condition have been recorded the scan continues. The duration of the scan interruption may be controlled by a timing means which controls the operation of converter 14 whereby after a predetermined time, operation of converter 14 ceases which causes printer 24 to cease operation to thereby apply a "1" on line 365 to NAND 330. Similarly, the duration of the scan interruption may be controlled by inserting a time delay means such as a monostable multivibrator in series between the output of power NAND 728 and coil 732.

Once the alarm condition at the field encoder has been corrected, contacts 742 will open and the capacitor in RC network 744 will discharge to provide a negative or "0" pulse to flip-flop 738 through diode 748 to set flip-flop 738 and provide a "1" to one input of clear NAND 722 so that the next time the field encoder is monitored a clear identification pulse will be generated by NAND 722 and supplied to timing and control circuit 300 through wire 706. The reception of a clear identification pulse operates in the same manner as previously described with respect to the alarm identification pulse to inhibit NAND 330 and permit the conditions at that particular field encoder to be sensed and recorded in digital form.

The pulses between times $t_3$ and $t_6$ are illustrated in order to aid in the explanation of the operation of the system when monitoring a field encoder that does not exhibit an alarm or clear condition; and, thus, the time $t_3$ to $t_6$ is determined by the clock pulses in timing and control circuit 300. The pulses between times $t_6$ and $t_{10}$ are primed and are illustrated in order to aid in the explanation of the operation of the system when monitoring a field encoder at which an alarm or clear condition exists. Alarm signal 916 is generated by NAND 724 when toggle flip-flop 716 is energized and lasts until reset pulse 914 inhibits alarm reset NAND 720, and the delay in the generation of the next shift pulse as described above in order to record information is illustrated as the time between $t_9$ and $t_{10}$. That is, if no alarm signal were generated the next shift pulse would have been generated at $t_9$. Clearly, the time delay between $t_9$ and $t_{10}$ will vary with the amount of information to be recorded.

If there is an internal fault in a field encoder prohibiting the return of an acknowledge pulse 912 by multivibrator 718, the absence of the acknowledge pulse inhibits further operation of NAND 330 due to flip-flop 342 remaining in its reset state. After a period of time determined by the time delay of multivibrators 366, 368, 372 and 376 a visual annunciator 380 will be energized to indicate an internal fault, and an internal acknowledge pulse 918 will be generated on line 337. Annunciator 380 may be deenergized by actuating push button switch 389 to reset flip-flop 396. Internal acknowledge pulse 918 is gated through NAND 336 under the control of a clock pulse from the $\bar{Q}$ output of multivibrator 318 and through NAND 334 to set flip-flop 342. A point override pulse 920 is generated on the trailing edge of internal acknowledge pulse 918 and is supplied to field encoders 700 by wire 310 to operate power NAND 756 of the faulty field encoder since its other inputs are "1's." Power NAND 756 energizes coil 760 to close contacts 762 and 764 to provide set control pulse 904 and clear control pulse 906 at the output of toggle flip-flop 716.

The number of the field encoder having the internal fault is recorded by printer 24 through the Q output of flip-flop 376, and the operation of printer 24 closes contact 362 to inhibit NAND 330 to delay the continuation of the scan until the information is recorded. Due to the connection of the $\bar{Q}$ output of flip-flop 342 as an input of NAND 374, neither an internal acknowledge pulse 918 nor a point override pulse 920 will be generated unless an acknowledge pulse 912 is not received to set flip-flop 342.

The pulses between times $t_{10}$ and $t_{15}$ are double primed and are illustrated in order to aid in the explanation of the operation of the system when a field encoder fails to generate an acknowledge pulse. Acknowledge pulse 912″ is dotted to indicate when it should have been generated, and reset pulse 914″ is generated at its normal time. When acknowledge pulse 912″ is not received after a predetermined period of time, internal acknowledge pulse 918 is generated and applied to flip-flop 342 to prime NAND 330 so that a next shift pulse 910‴ may be generated once contact 364 is opened to place a "1" on line 365 after operation of printer 24 has stopped. Point override pulse 920 is generated at $t_{14}$ on the trailing edge of internal acknowledge pulse 918 and places set control pulse 904 and clear control pulse 906 on the output of the toggle flip-flop 716 of the faulty field encoder so that the next succeeding field encoder may be energized upon the generation of shift pulse 910‴ after the recording delay. Of course, if an alarm or clear condition exists at the faulty field encoder, after the set control and clear control pulses are placed on the output of toggle flip-flop 716 the alarm condition will be detected, as previously described, and the next shift pulse will be further delayed while the conditions sensed are recorded.

If at any time either during a scan or between scans an alarm condition occurs at any field encoder, the closure of alarm contacts 742 will set flip-flop 734 as previously described, to provide a "0" at its $\bar{Q}$ output which causes the output of NAND 736 to change from a "0" to a "1" to cause an alarm signal to be generated by multivibrator 740 and supplied through wire 106 to scan initiation circuit 100. As previously described, the receipt of such an alarm signal will cause a new scan to be initiated due to the generation of synthetic end-of-scan pulses on lines 124, 146 and 148 unless the scan in progress was caused by a previous alarm signal from the field in which case the alarm signal will be stored in memory flip-flop 110a to initiate a scan the moment the scan in progress is completed. Similar operation will be effected when a clear condition occurs at any field encoder since the opening of contacts 742 sets flip-flop 738 to generate a clear signal through multivibrator 740.

Counting circuit 500 receives pulses from line 338, as previously described, and provides an output 526 indicating the field encoder being monitored. Whenever a new scan is initiated, the counter circuit is cleared by a synthetic or actual end-of-scan pulse on line 148 from scan initiation circuit 100.

If it is desired to monitor a preselected field encoder, the number of the field encoder is set into preselect circuit 534, as previously described, and a scan is initiated. When the number of acknowledge pulses received on line 338 is equal to the number of the preselected field encoder, a "0" is outputted by NAND 522 on line 524 to set flip-flop 360 which inhibits NAND 330 by placing a "0" on its $\bar{Q}$ output; and, accordingly, sufficient time is available to monitor and record the conditions at the preselected field encoder. When it is no longer desired to monitor the preselected encoder push button switch 362 is actuated to reset flip-flop 360 thereby permitting the scan to be completed.

The system may be modified to permit "all points" scans in which the conditions at each field encoder are monitored and recorded regardless of the presence of alarm conditions by reducing the clock frequency in timing and control circuit 300 such that power NANDS 728 in the field encoders are enabled prior to the generation of a next succeeding shift pulse. Such a modification can be implemented by connecting the active level flip-flop 112 in circuit 100 corresponding to the priority level associated with "all points" scans with a relay to switch an added capacitor into circuit with multivibrator 316 to lengthen the clock pulses to permit relays 732 to be energized between shift pulses.

The system may be further modified to provide separate priority levels for clear signals and alarm signals by adding a wire 106 and appropriate interrupt circuitry, as previously mentioned, and by inserting gates in series with the inputs to NAND 356 responsive to the active level flip-flop 112 corresponding to priority levels given the clear and alarm signals. Thus, a scan initiated by an alarm signal would not be interrupted by a clear condition, and a scan initiated by clear signal would not be interrupted by an alarm condition. Of course the above modification could also be designed to permit an alarm condition to interrupt a scan initiated by a clear signal, if desired.

The monitoring system of the present invention is simple in concept yet it is a substantial step forward in the monitoring field due to its speed compatible with computer speeds and its easy modification.

If it is desired to include additional field encoders in an existing system, the additional field encoders need only be connected with the last field encoder in the existing system and need not be connected with the control center by additional wires. All of the wires in cable 314 are common to each field encoder except the wires leading from the output of toggle flip-flop 716 of one field encoder to the input of toggle flip-flop 716 of the next succeeding field encoder; and, thus, in order to incorporate additional field encoders into a system, new wires are necessary only for the input-output connections of the toggle flip-flops 716 which effectively constitute shift register stages.

The components of the monitoring system of the present invention are standard thereby reducing inventory, and each field encoder contains substantially the same circuitry to further reduce inventory and to substantially reduce installation time.

While the present invention has been described as utilizing a stage of a shift register at each field encoder, it is clear that the term "shift register" includes all circuits capable of sequentially energizing a plurality of stages individually.

In as much as the present invention is subject to many variations, modifications and changes in detail, it is intended that all matter described in the foregoing specification or shown in the accompanying drawings shall be interpreted as illustrative and not in a limiting sense.

What is claimed is:

1. A sequential monitoring system comprising
a control center including control means for generating shift pulses;
a plurality of field encoders disposed at locations remote from said control center, each of said field encoders including a shift register stage and means responsive to energization of said shift register stage for generating signals in accordance with conditions to be monitored; and
cable means interconnecting said control center and said field encoders, said cable means including a wire for supplying said shift pulses from said control center to each of said field encoders and wires for supplying said condition signals from said field encoders to said control center;
said shift register stages of said field encoders being serially interconnected and each having shift input means connected with said wire for supplying said shift pulses whereby said shift register stages are sequentially energized to provide sequential scanning of said plurality of field encoders at said control center.

2. The invention as recited in claim 1 wherein said cable means includes wires common to each encoder to carry said shift pulses and said condition signals whereby any number field encoders may be added to the monitoring system without the necessity of additional wires connected with the said control center.

3. The invention as recited in claim 1 wherein each of said field encoders includes means for generating an acknowledge pulse when the shift register stage associated with each of said field encoders is energized, and said cable means includes a wire common to each field encoder for supplying said acknowledge pulses to said control center.

4. The invention as recited in claim 3 wherein said control center includes counting means for receiving and counting said acknowledge pulses such that the field encoder being monitored may be determined from said counting means.

5. The invention as recited in claim 4 wherein said control means includes shift pulse generating means operable in response to the receipt of an acknowledge pulse to generate a shift pulse.

6. The invention as recited in claim 5 wherein said control means includes gating means receiving said acknowledge pulses and responsive thereto to operate said shift pulse generating means, time delay means connected with said shift pulse generating means, internal acknowledge pulse generating means connected with said time delay means to generate an internal acknowledge pulse a predetermined time after a shift pulse is generated if no acknowledge pulse is received in the interim, and means supplying said internal acknowledge pulse to said gating means to operate said shift pulse generating means.

7. The invention as recited in claim 6 wherein said control center includes recording means connected with said internal acknowledge pulse generating means and said counting means to record data indicating by count which field encoder failed to generate an acknowledge pulse.

8. The invention as recited in claim 7 wherein said counting means is connected with said gating means to count pulses corresponding to said acknowledge pulses and said internal acknowledge pulses.

9. The invention as recited in claim 6 wherein said control means includes control pulse generating means for generating a control pulse at the commencement of a scan, said shift register stage in each field encoder having control input means for receiving control pulses and output means, and said cable means includes wires connecting the output means of each shift register stage to the input means of the shift register stage in the next succeeding field encoder and connecting the control pulse generated at said control center to the input means of the shift register stage in the first field encoder.

10. The invention as recited in claim 9 wherein said control means includes override pulse generating means connected with said internal acknowledge pulse generating means to generate an override pulse in response to an internal acknowledge pulse, each of said field encoders includes bypass means connected from the input means to the output means of each shift register stage, and said cable means includes a wire common to each field encoder to supply said override pulse to the bypass means of each field encoder whereby a control pulse at the input means of the shift register stage of a field encoder that fails to generate an acknowledge pulse bypasses the shift register stage to the output means thereof such that a fault at one field encoder does not inhibit the continuous scanning operation of the monitoring system.

11. A sequential monitoring system comprising
a control center including control means for generating shift pulses and scan initiation means connected with said control means and having an alarm input for receiving an alarm signal;
a plurality of field encoders disposed at locations remote from said control center, each of said field encoders including a stage of a shift register for receiving said shift pulses and means for generating signals in accordance with conditions to be monitored, said signal generating means in each of said field encoders including alarm signal generating means for providing an alarm signal in response to an alarm condition existing at the field encoder; and
cable means interconnecting said control center and said field encoders, said cable means including a wire for supplying said shift pulses from said control center to each of said field encoders, wires for supplying said condition signals from said field encoders to said control center and a wire common to each field encoder for supplying said alarm signal to said alarm input of said scan initiation means;

said scan initiation means including scan initiation pulse generating means for supplying said control means with a scan initiation pulse in response to said alarm signal to cause the generation of said shift pulses by said control means whereby the monitoring system scans said field encoders to find the field encoder from which said alarm signal was generated.

12. The invention as recited in claim 11 wherein each of said field encoders includes alarm identification means for providing a signal indicating that an alarm condition exists at the field encoder, and said cable means includes a wire common to each field encoder and connected with said control means whereby the field encoder at which an alarm condition exists may be identified during scanning of said field encoders.

13. The invention as recited in claim 12 wherein each of said field encoders includes clear identification means for providing a signal indicating that an alarm condition existing at the field encoder has been corrected, and said cable means includes a wire common to each field encoder and connected with said control means whereby the field encoder at which an alarm condition has been corrected may be identified during scanning of said field encoders.

14. The invention as recited in claim 13 wherein each of said field encoders includes acknowledge pulse generating means for generating an acknowledge pulse when the shift register stage associated with each of said field encoders is energized, said control center includes counting means for receiving and counting said acknowledge pulses, and said cable means includes a wire common to each encoder for supplying said acknowledge pulses to said control center.

15. The invention as recited in claim 14 wherein said control center includes recording means connected with said counting means and said cable means to receive and record said alarm identification signals and said clear identification signals along with the count in said counting means whereby the field encoder producing an alarm identification pulse or a clear identification pulse is identified.

16. The invention as recited in claim 14 wherein said condition signal generating means in each field encoder includes means for providing analog signals representing conditions measured at said field encoders, said control center includes an analog-to-digital converter for receiving said analog signals and converting said analog signals into digital signals, means connecting said converter with said recording means to apply said digital signals thereto to record said digital signals along with the count in said counting means to identify the field encoder which produced the analog signals, and said cable means includes wires common to each field encoder to supply said analog signals to said converter.

17. The invention as recited in claim 16 wherein said control means includes shift pulse generating means, gating means having a plurality of inputs and an output connected with said shift pulse generating means for controlling the operation thereof, timing means for receiving said alarm identification signals and said clear identification signals and having an output connected with a first input of said gating means to inhibit said gating means for a predetermined time in response to the receipt of an alarm identification signal or a clear identification signal, and acknowledge pulse receiving means for receiving said acknowledge pulses and having an output connected with a second input of said gating means to prime said gating means after the receipt of an acknowledge pulse whereby a succeeding shift pulse is delayed if an acknowledge pulse in response to a preceding shift pulse is delayed or if an alarm identification signal or clear identification signal is received.

18. The invention as recited in claim 17 wherein a third input of said gating means is connected with said recording means and said converter to inhibit said gating means when said recording means or said converter is in operation.

19. The invention as recited in claim 18 wherein said control means includes clocking means for synchronizing the operation of said control means and permitting a shift pulse to be generated only after the elapse of a predetermined time after a preceding shift pulse.

20. The invention as recited in claim 19 wherein said means for providing analog signals in each field encoder includes time delay means for delaying said analog signals for a predetermined time longer than the predetermined time between shift pulses whereby a scan of said field encoders is not interrupted except by alarm identification signals and clear identification signals.

21. The invention as recited in claim 11 wherein said scan initiation means includes a second input for receiving scan request signals of a lower priority than said alarm signals and priority means for receiving said alarm signals and said lower priority signals and operating said scan initiation pulse generating means in accordance with the highest priority input.

22. The invention as recited in claim 21 wherein said control center includes means connected with said control means for generating an end-of-scan pulse after all of said field encoders have been monitored to reset said control means, and said priority means includes means connected with said control means for generating a synthetic end-of-scan pulse to reset said control means and stop a scan in progress in response to the receipt of an alarm signal when the scan in progress was not initiated by an alarm signal.

23. The invention as recited in claim 14 wherein said control center includes field encoder preselect means connected with said counting means to provide an output when the number of acknowledge pulses counted by said counting means equals the number of the preselected field encoder, and said output is connected with said control means to interrupt the generation of shift pulses to permit conditions of the preselected field encoder to be monitored.